(12) United States Patent
Burdick

(10) Patent No.: US 8,456,116 B2
(45) Date of Patent: Jun. 4, 2013

(54) POWER SUPPLY SYSTEM AND METHOD WITH REMOTE VARIABLE FREQUENCY DRIVE (VFD)

(75) Inventor: John F. Burdick, Friendswood, TX (US)

(73) Assignee: Cameron International Corporation, Houston, TX (US)

(*) Notice: Subject to any disclaimer, the term of this patent is extended or adjusted under 35 U.S.C. 154(b) by 430 days.

(21) Appl. No.: 12/815,547

(22) Filed: Jun. 15, 2010

(65) Prior Publication Data
US 2011/0304289 A1    Dec. 15, 2011

(51) Int. Cl.
*H02P 27/00* (2006.01)
(52) U.S. Cl.
USPC ............ 318/400.3; 318/400.29; 318/461
(58) Field of Classification Search
USPC ............ 318/400.3, 400.29, 461, 701
See application file for complete search history.

(56) References Cited

U.S. PATENT DOCUMENTS

| | | | |
|---|---|---|---|
| 5,117,174 A | 5/1992 | Kessler | |
| 6,531,842 B2 | 3/2003 | LeDoux et al. | |
| 7,202,619 B1 * | 4/2007 | Fisher | 318/400.29 |
| 2009/0160187 A1 | 6/2009 | Scholte-Wassink | |
| 2010/0123423 A1 | 5/2010 | Campbell et al. | |

OTHER PUBLICATIONS

PCT/US2011/036840 International Search Report and Written Opinion of the International Searching Authority, Feb. 9, 2012, pp. 1-9.

* cited by examiner

*Primary Examiner* — Karen Masih
(74) *Attorney, Agent, or Firm* — Chamberlain Hrdlicka

(57) ABSTRACT

In at least some embodiments, a system includes a first remote tool. The system also includes a variable frequency drive (VFD) coupled to the first remote tool, wherein the output of the VFD powers the first tool and wherein at least part of the VFD is in situ with the first remote tool.

20 Claims, 10 Drawing Sheets

POWER SUPPLY SYSTEM AND METHOD WITH REMOTE VARIABLE FREQUENCY DRIVE (VFD)

CROSS REFERENCE TO RELATED APPLICATIONS

Not applicable.

BACKGROUND

In hydrocarbon exploration or other projects that involve powering remote tools, the power supply configuration is not trivial. For example, the selection and positioning of power supply components can affect rig deck space, retrievability of remote components, umbilical size, and electrical harmonics. As step out distances increase (i.e., increasing the remoteness of tools), power supply issues, such as retrievability of remote components, umbilical size, and electrical harmonics, become even more important.

BRIEF DESCRIPTION OF THE DRAWINGS

For a detailed description of exemplary embodiments of the invention, reference will now be made to the accompanying drawings in which.

NOTATION AND NOMENCLATURE

Figure 1A:
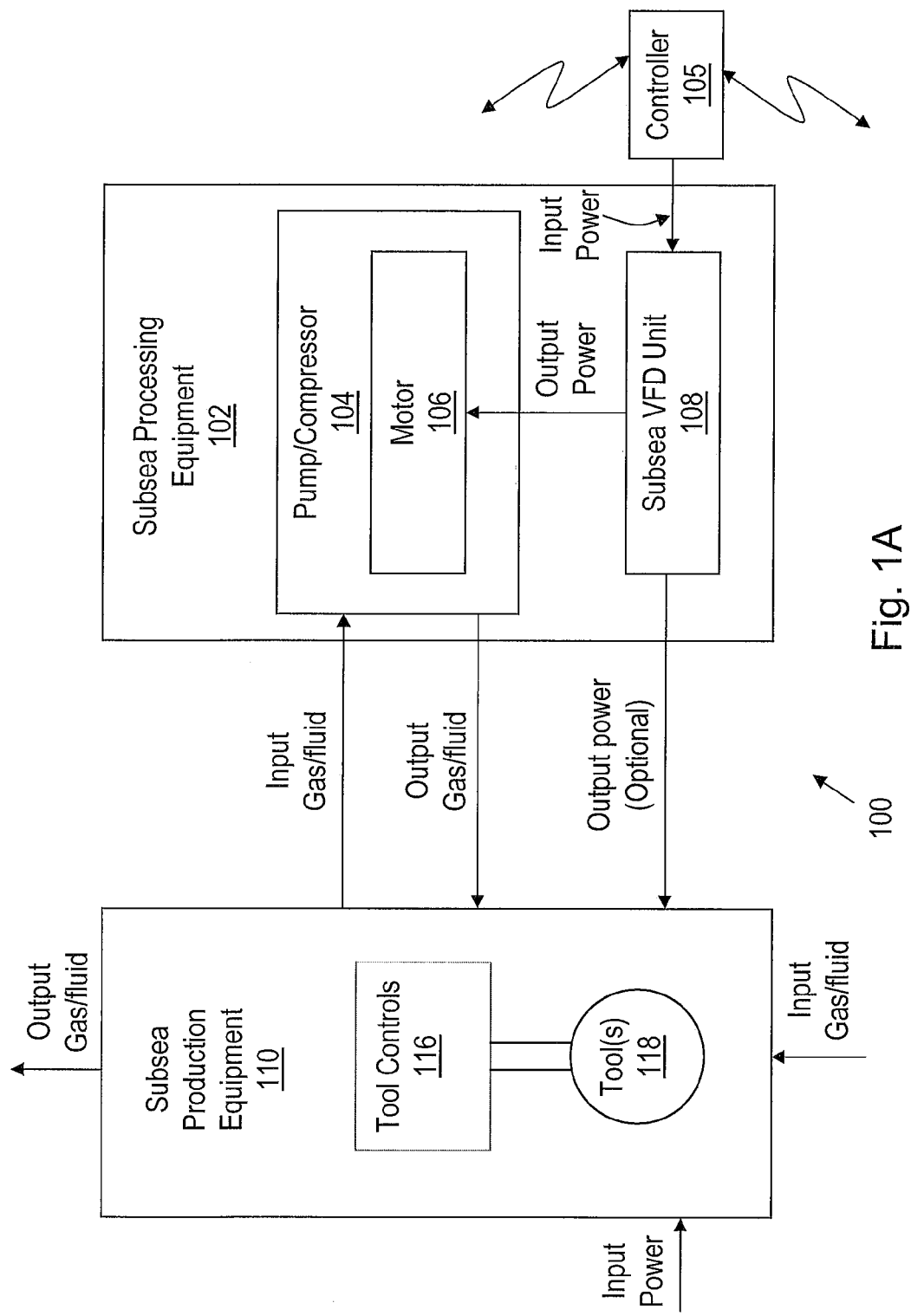
FIGS. 1A-1B illustrate subsea systems in accordance with an embodiment of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. For example, although specific power supply ranges (i.e., AC or DC transmissions from one component to another) are illustrated for the embodiments disclosed herein, other embodiments are not necessarily limited to these power supply ranges.

It is to be fully recognized that the different teachings of the embodiments discussed below may be employed separately or in any suitable combination to produce desired results. Any use of any form of the terms "connect", "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1B:
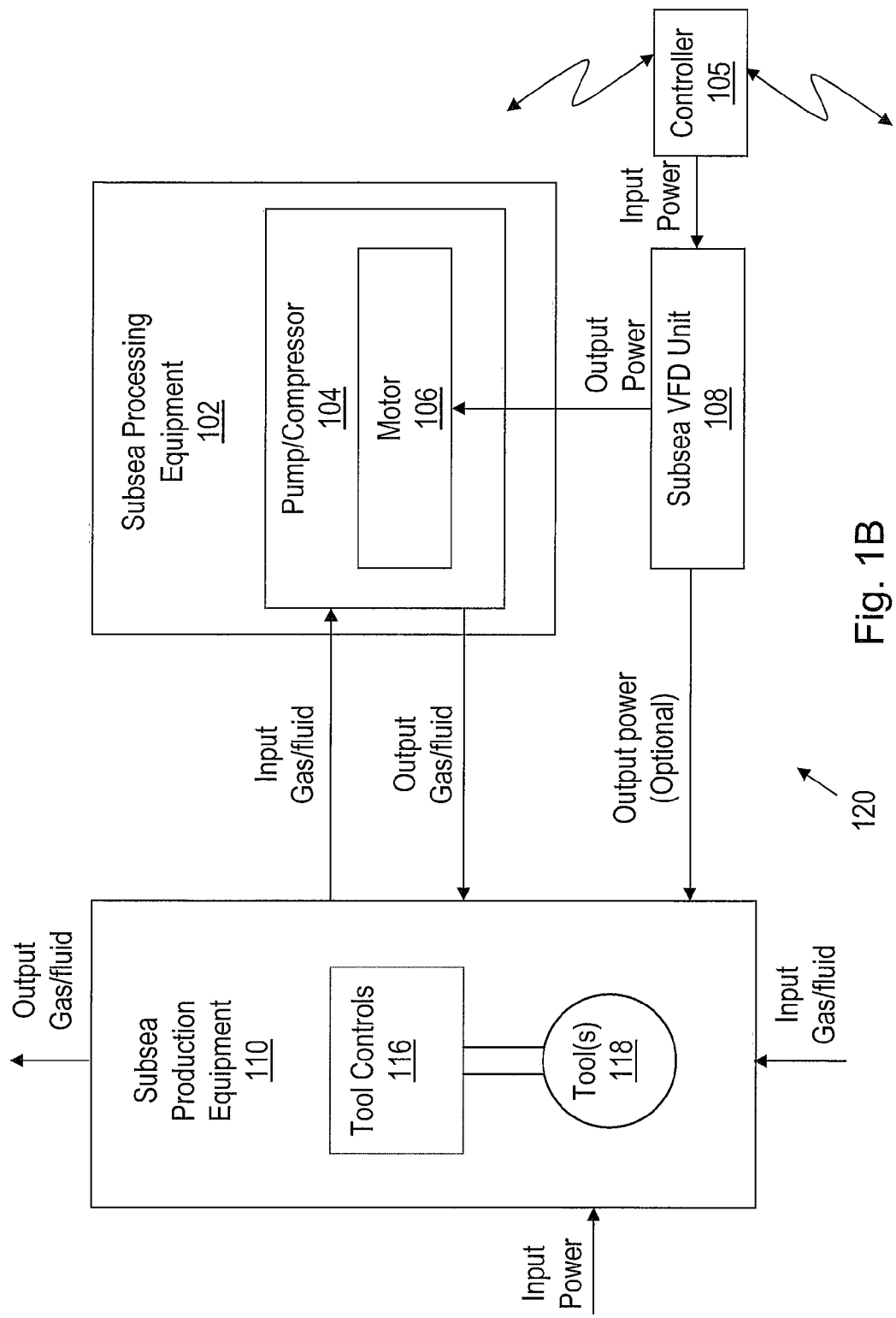

FIGS. 1A-1B illustrate subsea systems in accordance with embodiments of the disclosure. In FIG. 1A, the subsea system 100 comprises subsea processing equipment 102 interacting with subsea production equipment 110. The subsea processing equipment 102 comprises a pump or compressor 104 with a motor 106. The pump/compressor 104 is configured to receive input fluids, which may have suspended particulates, from the subsea production equipment 110 and then output pressurized fluid back to the subsea production equipment 110. Normally, the pump/compressor 104 is started under load so it must be started slowly to reduce shock to components such as bearings, seals, couplings, etc. Also, the process is cold and viscous until flow is established for some time. Gradually, the speed of the motor 106 is increased by applying higher frequencies with the subsea variable frequency drive (VFD) unit 108 until the subsea processing equipment 102 reaches the desired pump or compression output conditions. In other words, the subsea VFD unit 108 is configured to selectively change the frequency of the output power to the motor 106. The VFD unit 108 is in communication with a controller 105 that is in communication with any number of components of the subsea system 100.

As shown, the subsea VFD unit 108 is configured to receive and output sufficient power for the motor 106. Optionally, the subsea VFD unit 108 is able to output power to the subsea production equipment 110. In such case, the subsea VFD unit 108 receives more then enough power for the motor 106 and is able to divert extra power to the subsea production equipment 110. In some embodiments, the subsea VFD unit 108 receives and outputs sufficient power for both the subsea processing equipment 102 and the subsea production equipment 110.

As shown in FIG. 1, the subsea production equipment 110 comprises tool controls 116 and tool(s) 118. In accordance with varying embodiments, the tool controls 116 and tool(s) 118 may correspond to components of a subsea tree, a subsea manifold, a blowout (BOP) stack assembly, or related control equipment. Accordingly, the tool controls 116 and tool(s) 118 may relate to the operation of various valves, communication equipment, sensors, or other components of a subsea tree, a subsea manifold, or a blowout (BOP) stack assembly. In operation, the subsea production equipment 110 is configured to receive input gas/fluid from a wellhead assembly (not shown) and to output gas/fluid towards a surface vessel or rig (e.g., via a riser assembly). In some scenarios, the flow may be reversed for the subsea production equipment 110 such that fluids are pumped into the wellhead assembly rather than extracted from the wellhead assembly. Regardless of the direction of flow, the subsea processing equipment 102 may change the pressure of gas/fluid passing through the subsea production equipment 110. In some embodiments, storage equipment (not shown) may be utilized to house gas or fluid before or after it is pressurized by the subsea processing equipment 110. In other words, extracted gas/fluid from a wellhead assembly is not necessarily transferred immediately to the surface. In FIG. 1B, the subsea system 120 is similar to the subsea system 100, except that the subsea VFD unit 108 is separate from the subsea processing equipment 102.

FIGS. 2-8 illustrate various power supply configurations in accordance with embodiments. The various disclosed power supply configurations are intended to improve rig spacing requirements, retrievability of subsea equipment, umbilical size/expense and/or electrical harmonics that become an issue at long step-out distances.

Figure 2:
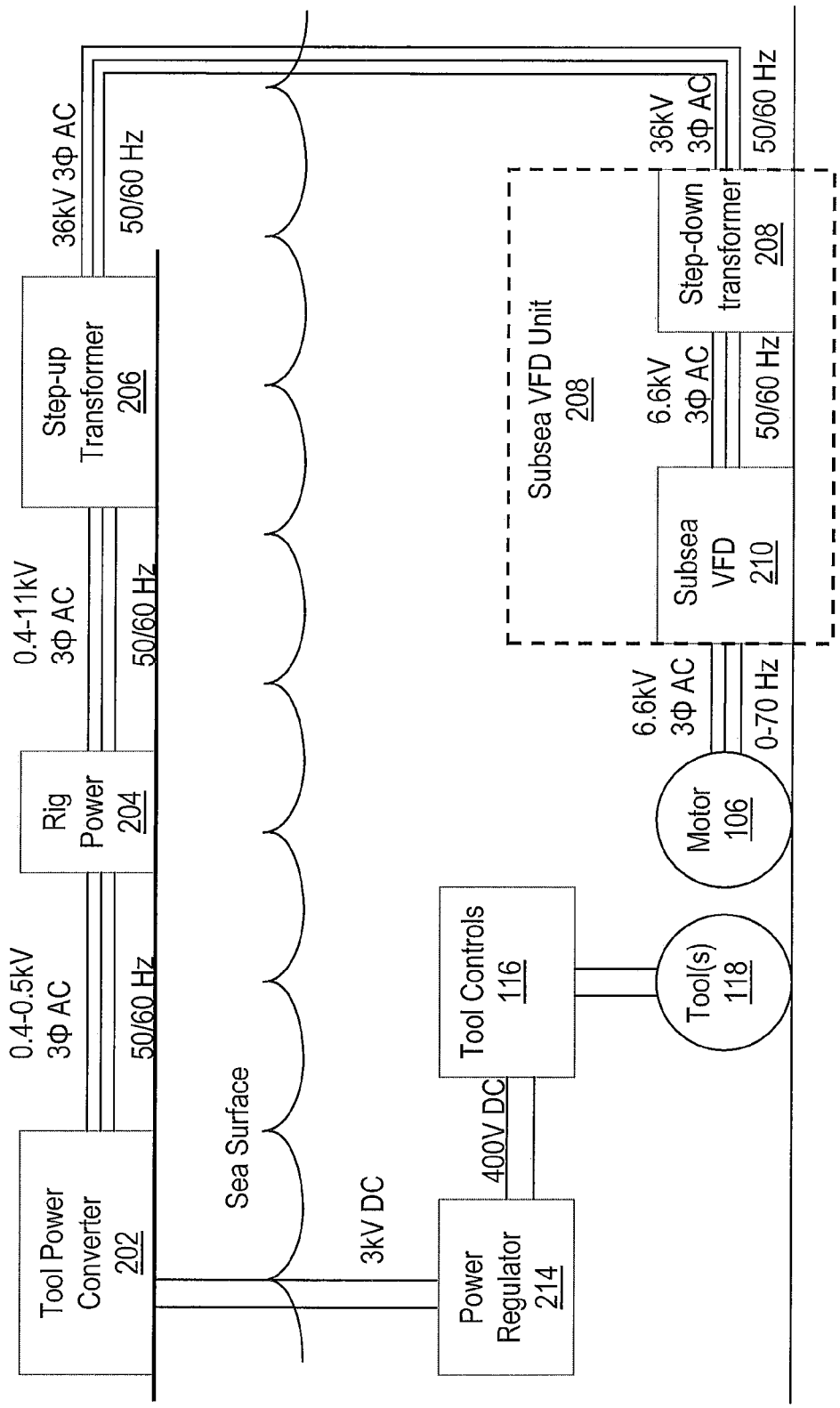
FIG. 2 illustrates a power supply configuration for remote tools in accordance with an embodiment of the disclosure.

FIG. 2 illustrates a power supply configuration 200 for remote tools in accordance with an embodiment of the disclosure. In FIG. 2, the power supply configuration 200 comprises a subsea VFD 210 that may be part of a subsea VFD unit 208 (a version of the subsea VFD unit 108 described for FIGS. 1A-1B). In at least some embodiments of the power supply configuration 200, a step-up transformer 206 receives 3-phase AC power at about 0.4 kV to 11 kV and 50-60 HZ from a rig power unit 204. As shown, 3-phase AC power at about 36 kV and 50-60 Hz may be provided from the step-up transformer 206 to a remotely located step-down transformer 208, which may be part of the subsea VFD unit 208. Regardless of whether the step-down transformer 208 is part of the subsea VFD unit 208, the subsea VFD 210 receives the output (e.g., 3-phase AC power at about 6.6 kV and 50-60 Hz) of the step-down transformer 208 and powers the motor 106 using variable frequency 3-phase AC power at about 6.6 kV and 0-70 Hz.

With the power supply configuration 200, fewer surface components are needed compared to a power supply configuration that positions all transformer components and VFD components at the surface. Accordingly, the power supply configuration 200 may be implemented to increase rig or vessel deck space. Further, the power supply configuration 200 reduces or eliminates the electrical harmonics issue mentioned previously by use of subsea VFD 210 instead of a surface VFD. In the power supply configuration 200 of FIG. 2, the subsea VFD unit 208 powers the motor 106, but not the tool controls 116 and tools 118. As shown, the tool controls 116 and tool(s) 118 receive power from a surface tool power converter the converts AC power from rig power unit 204 to a high DC voltage (e.g., 3 kV) for transport to a remote subsea location. At the remote subsea location, a power regulator 214 converts the high DC voltage to a lower DC voltage (e.g., 400V) for use by the tool controls 116 and tool(s) 118.

Figure 3:
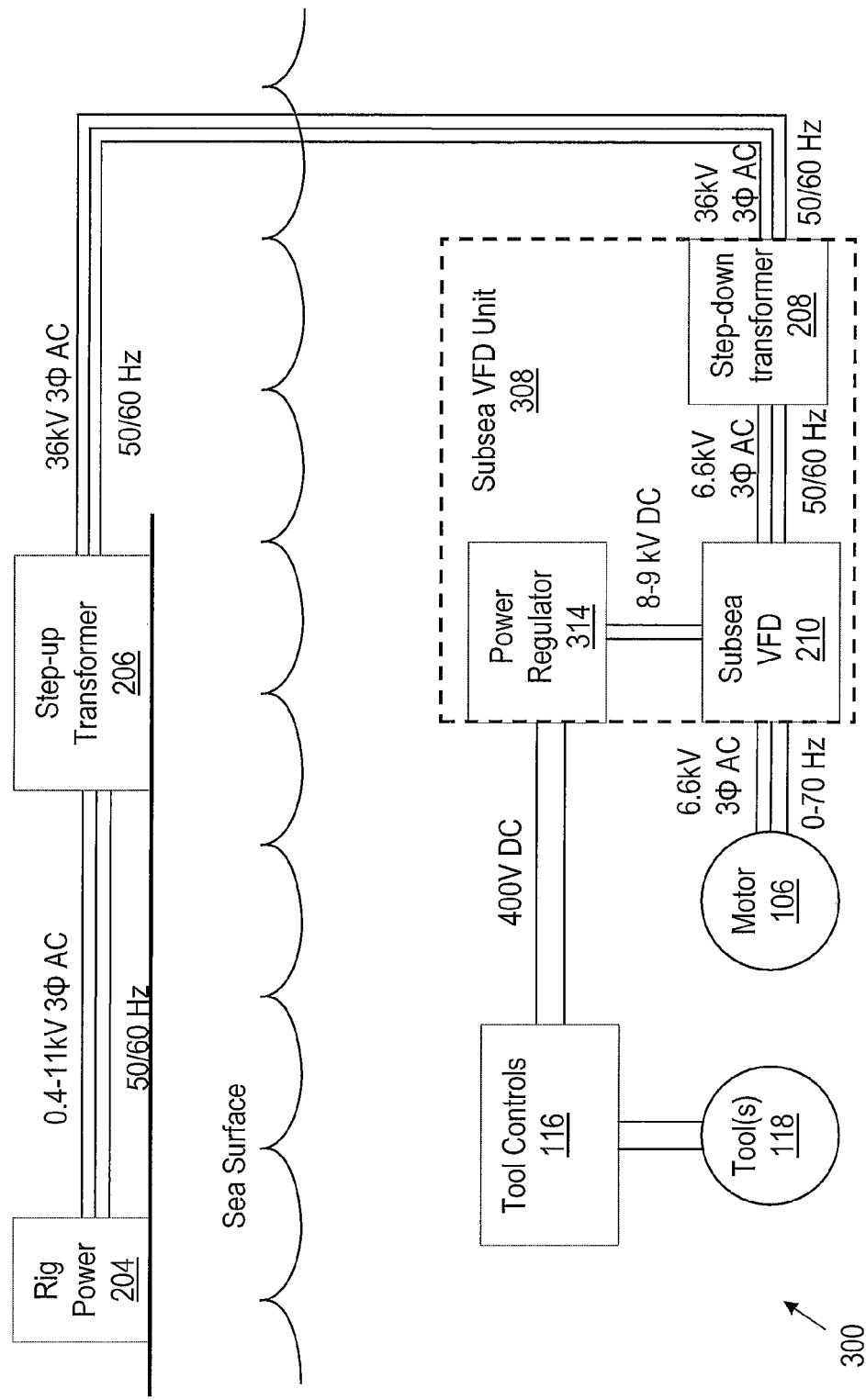
FIG. 3 illustrates another power supply configuration for remote tools in accordance with an embodiment of the disclosure.

FIG. 3 illustrates another power supply configuration 300 for remote tools in accordance with an embodiment of the disclosure. As shown, the power supply configuration 300 comprises a subsea VFD unit 308 with the step-down transformer 208 and the subsea VFD 210 as described for the power supply configuration 200. In addition, the subsea VFD unit 308 comprises a power regulator 314 that receives a high DC voltage (e.g., 8-9 kV) from the subsea VFD 206 and outputs a lower DC voltage (e.g., 400V) to the tool controls 116 and/or tool(s) 118. As described for FIG. 1, the tool controls 116 and tool(s) 118 may be components of subsea production equipment 110.

In at least some embodiments of the power supply configuration 300, the step-up transformer 206 receives 3-phase AC power at about 0.4 to 11 kV and 50-60 HZ from the rig power unit 204. As shown, 3-phase AC power at about 36 kV and 50-60 Hz may be provided from the step-up transformer 206 to the remotely located step-down transformer 208. The subsea VFD 210 receives the output (e.g., 3-phase AC power at about 6.6 kV and 50-60 Hz) of the step-down transformer 208 and powers the motor 106 using variable frequency 3-phase AC power at about 6.6 kV and 0-70 Hz. Some amount of DC power (e.g., about 8-9 kV) is also re-directed from the subsea VFD 210 to a power regulator 314 for provisioning power (e.g., about 400V DC) to the tool controls 116 and tool(s) 118. In alternative embodiments, the subsea VFD 210 is positioned some distance from the power regulator 314 and is enclosed in a separately retrievable enclosure.

With the power supply configuration 300, fewer surface components are needed compared to a power supply configuration that positions all transformer components and VFD components at the surface. Accordingly, the power supply configuration 300 may be implemented to increase rig or vessel deck space. Further, the power supply configuration 300 reduces or eliminates the electrical harmonics issue mentioned previously by use of the subsea VFD 210 instead of a surface VFD. Further, the provisioning of power for the tool controls 116 and tool(s) 118 is accomplished by re-directing some power from the subsea VFD 210. Accordingly, for the power supply configuration 300, the tool power supply 202 is eliminated and the total number of umbilical conductors is reduced compared to the power supply configuration 200.

Figure 4:
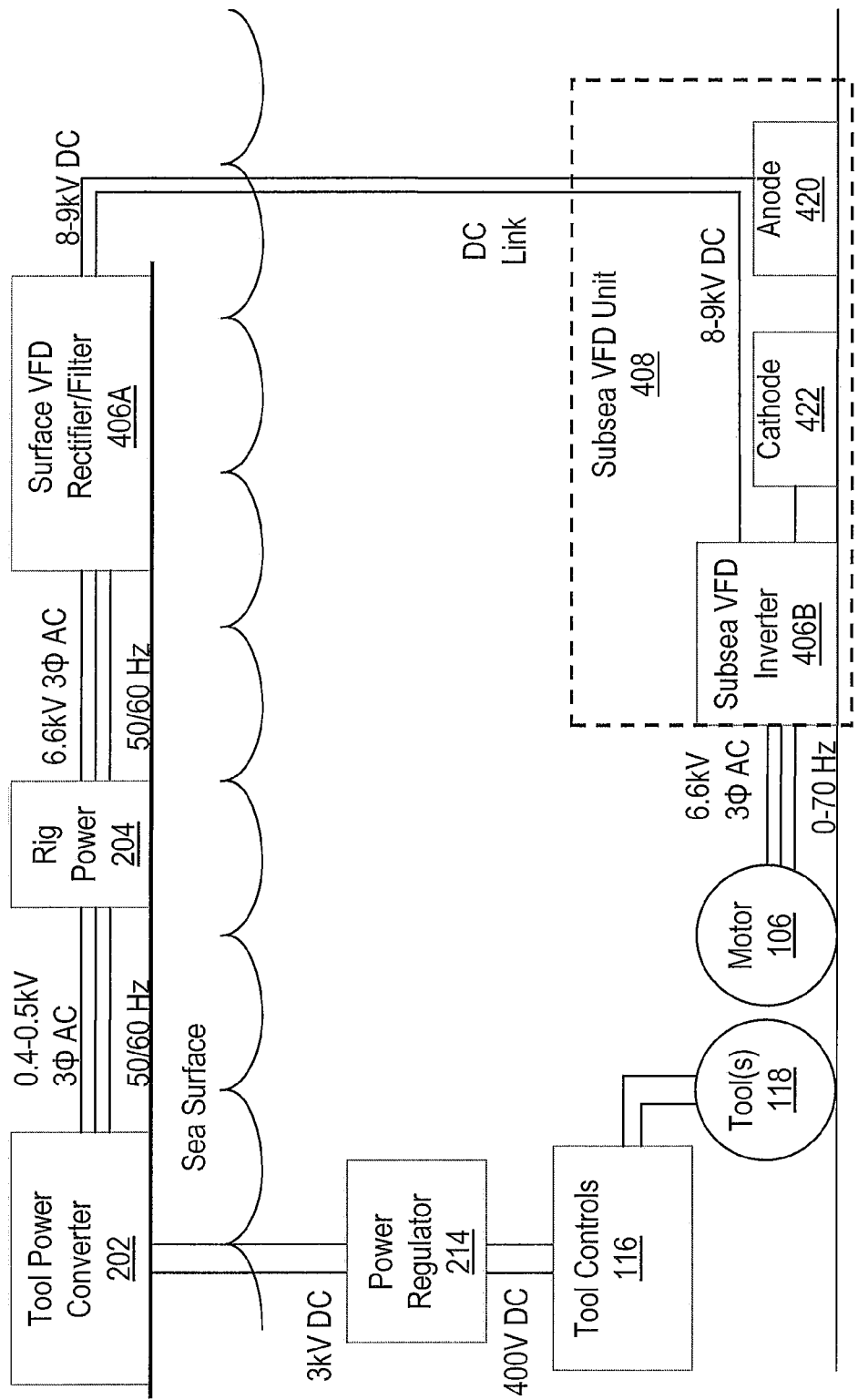
FIG. 4 illustrates a split variable frequency drive (VFD) power supply configuration for remote tools in accordance with an embodiment of the disclosure.

FIG. 4 illustrates a split VFD power supply configuration 400 for remote tools in accordance with an embodiment of the disclosure. In FIG. 4, the split VFD power supply configuration 400 comprises a surface VFD rectifier/filter 406A that receives power (e.g., 3-phase AC power at about 6.6 kV and 50-60 Hz) from the rig power unit 204. The surface VFD rectifier/filter 406A outputs DC power at 8-9 kV to a subsea VFD inverter 406B, which is part of a subsea VFD unit 408. The subsea VFD inverter 406B outputs power (e.g., 3-phase AC power at about 6.6 kV and 0-70 Hz) to motor 106. As shown, the surface VFD rectifier/filter 406A couples to a remote anode 420 and the subsea VFD inverter 406B couples to a cathode 422. The cathode 422 and anode 420 may be part of the subsea VFD unit 408. Alternative, the cathode 422 and/or the anode 420 may be separate from and coupled to the subsea VFD unit 408. In at least some embodiments, the anode 420 and the cathode 422 are made of alloy materials and may be coated with rare earth materials to resist erosion. The anode 420 and cathode 422 are positioned, for example, near the equipment (i.e., the subsea VFD inverter 406B and/or motor 106) at either end of the circuit but not so close as to cause current induced corrosion. Because current density drops in proportion to the cube of the distance from an object, electrodes such as anode 420 and cathode 422 are positioned relatively close (10-15 meters) to the equipment.

With the power supply configuration 400, fewer surface components are needed compared to a power supply configuration that positions all transformer components and VFD components at the surface. Accordingly, the power supply configuration 400 may be implemented to increase rig or vessel deck space. Further, the power supply configuration 400 reduces or eliminates the electrical harmonics issue discussed previously by use of the split VFD 406A, 406B instead of a surface VFD. Further, the power supply configuration 400 eliminates use of a heavy (difficult to retrieve) step-down transformer (e.g., step-down transformer 208) at the remote location. For power supply configuration 400, the provisioning of power to tool controls 116 and tool(s) 118 is the same configuration as shown for power supply configuration 200.

Figure 5:
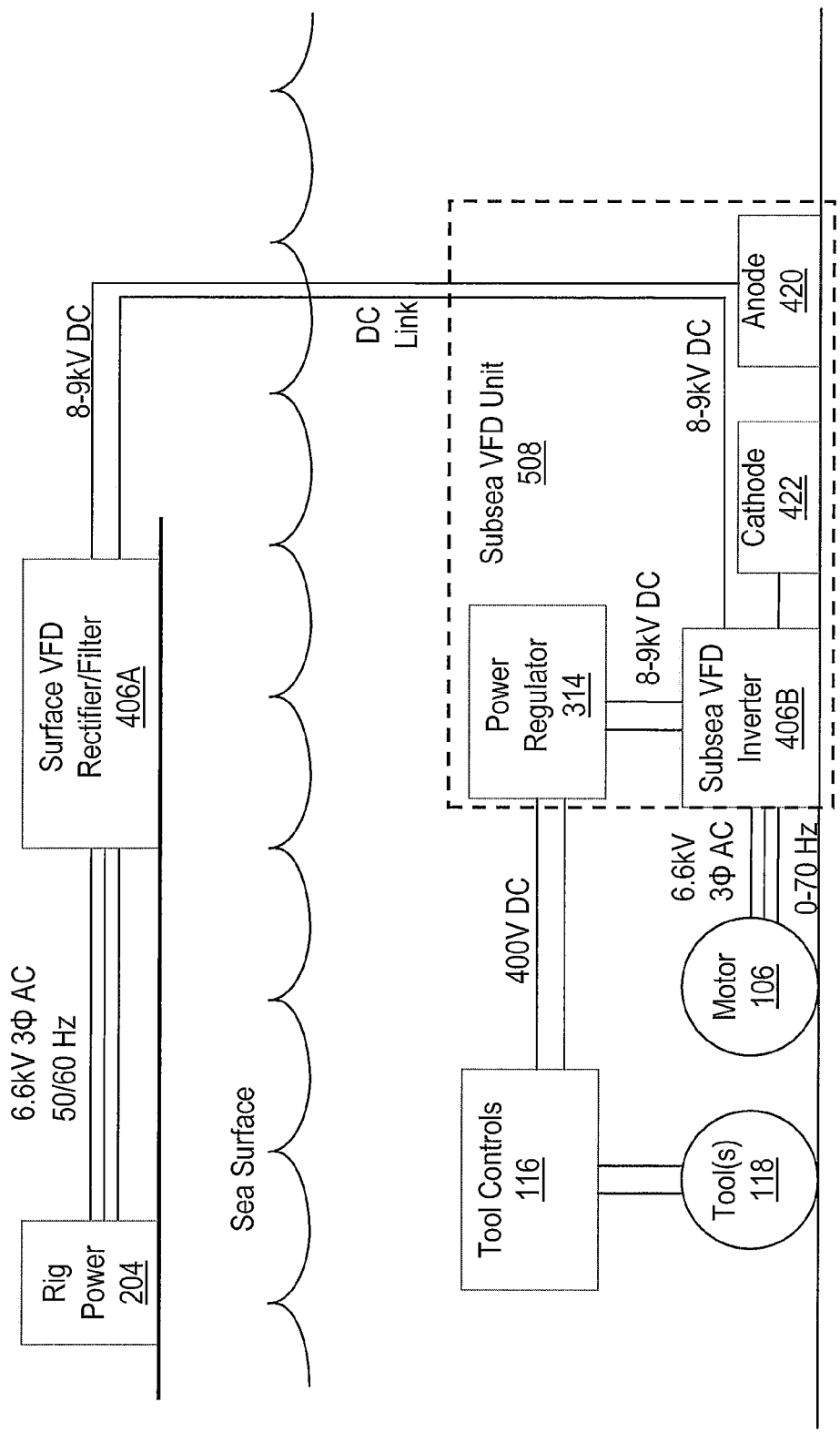
FIG. 5 illustrates another split VFD power supply configuration for remote tools in accordance with an embodiment of the disclosure.

FIG. 5 illustrates another split VFD power supply configuration 500 for remote tools in accordance with an embodiment of the disclosure. In FIG. 5, the split VFD power supply configuration 500 comprises the surface VFD rectifier/filter 406A that receives power (e.g., 3-phase AC power at 6.6 kV and 50-60 Hz) from the rig power unit 204. The surface VFD rectifier/filter 406A outputs DC power at 8-9 kV to the subsea VFD inverter 406B, which powers motor 106 using 3-phase AC power at 6.6 kV and 0-70 Hz. As shown, the surface VFD rectifier/filter 406A couples to the anode 420 and the subsea VFD inverter 406B couples to cathode 422. The anode 420, cathode 422, and subsea VFD inverter 406B may be part of a subsea VFD unit 508. Alternatively, the anode 420 and/or cathode 422 may be separate from the subsea VFD unit 508. Some amount of DC power (e.g., about 8-9 kV) is also re-directed from the subsea VFD inverter 406B to a power regulator 314 for provisioning power (e.g., 400V DC) to the tool controls 116 and tool(s) 118. In the split VFD power supply configuration 500, the power regulator 314 is shown as part of the subsea VFD unit 508. Optionally, the power regulator 314 is separate from the subsea VFD unit 508.

With the power supply configuration 500, fewer surface components are needed compared to a power supply configuration that positions all transformer components and VFD components at the surface. Accordingly, the power supply configuration 500 may be implemented to increase rig or vessel deck space. Further, the power supply configuration 500 reduces or eliminates the electrical harmonics issue mentioned previously by use of the split VFD 406A, 406B instead of a surface VFD. Further, the power supply configuration 500 eliminates use of a heavy (difficult to retrieve) step-down transformer (e.g., step-down transformer 208) at the remote location. Further, the provisioning of power for the tool controls 116 and tool(s) 118 is accomplished by re-directing some power from the subsea VFD inverter 406B. Accordingly, for the power supply configuration 500, the tool power supply 202 is eliminated and the total number of umbilical conductors is reduced compared to the power supply configurations 200 and 400.

Figure 6:
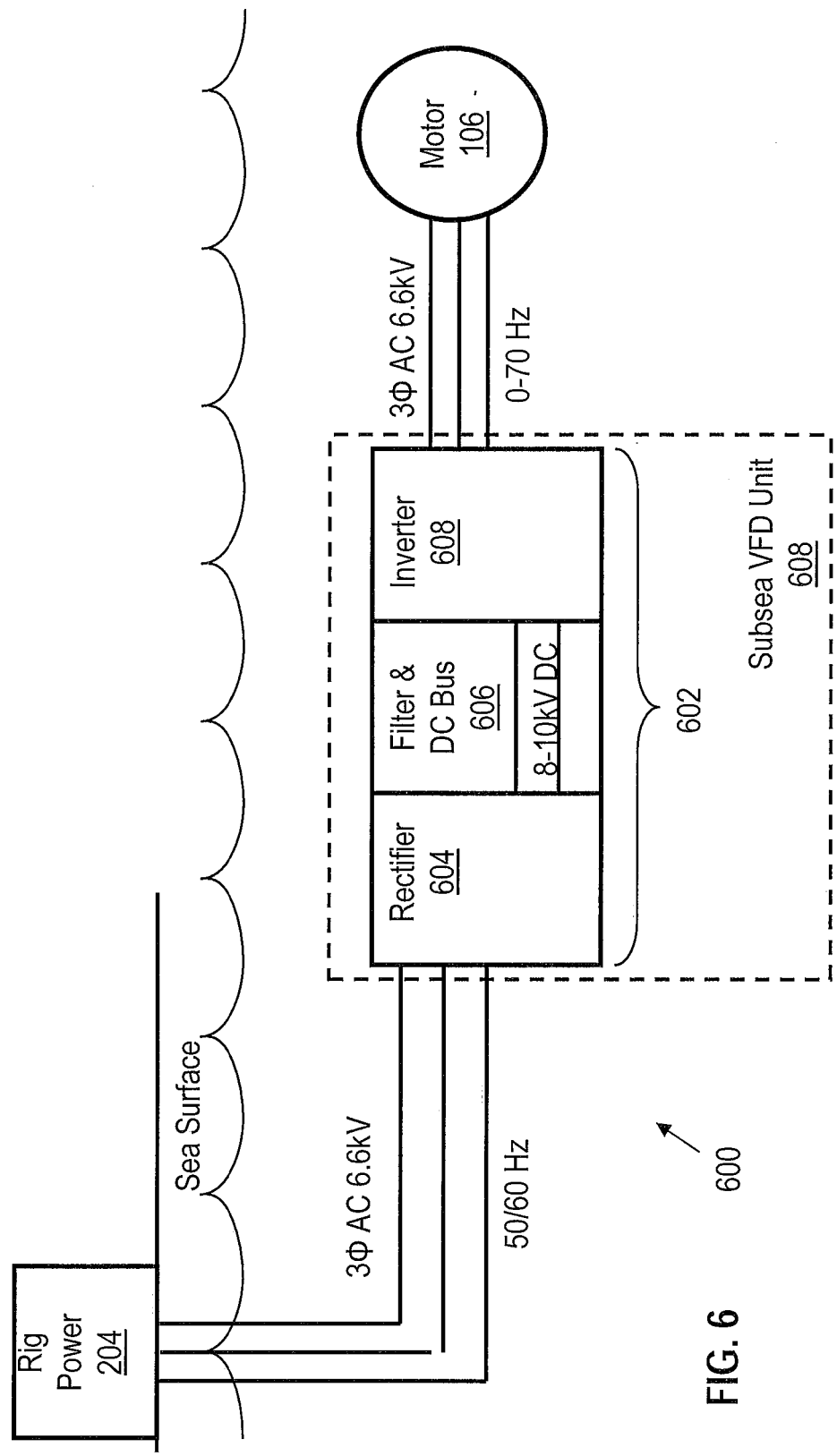
FIG. 6 illustrates a remote VFD power supply configuration for remote tools in accordance with an embodiment of the disclosure.

FIG. 6 illustrates a remote variable frequency drive (VFD) power supply configuration 600 for remote tools in accordance with an embodiment of the disclosure. As shown in FIG. 6, the remote VFD power supply configuration 600 comprises a rig power unit 204 that provides power (e.g., 3-phase AC power at about 6.6 kV and 50-60 Hz) to a remote VFD 602 that may be part of a subsea VFD unit 608. The remote VFD 602 comprises a rectifier portion 604, a filter and DC bus portion 606, and an inverter portion 608. As an example, the rectifier portion 604 may convert 3-phase AC power at about 6.6 kV and 50-60 Hz to about 8-10 kV DC power. The filter and DC bus portion 606 then smoothes the rectified voltage and transfers the rectified/smoothed voltage to the inverter portion 608. Finally, the inverter portion 608 operates on the DC voltage received from the filter and DC bus portion 606 to output variable 3-phase AC at about 6.6 kV and 0-70 Hz to motor 106.

Figure 7:
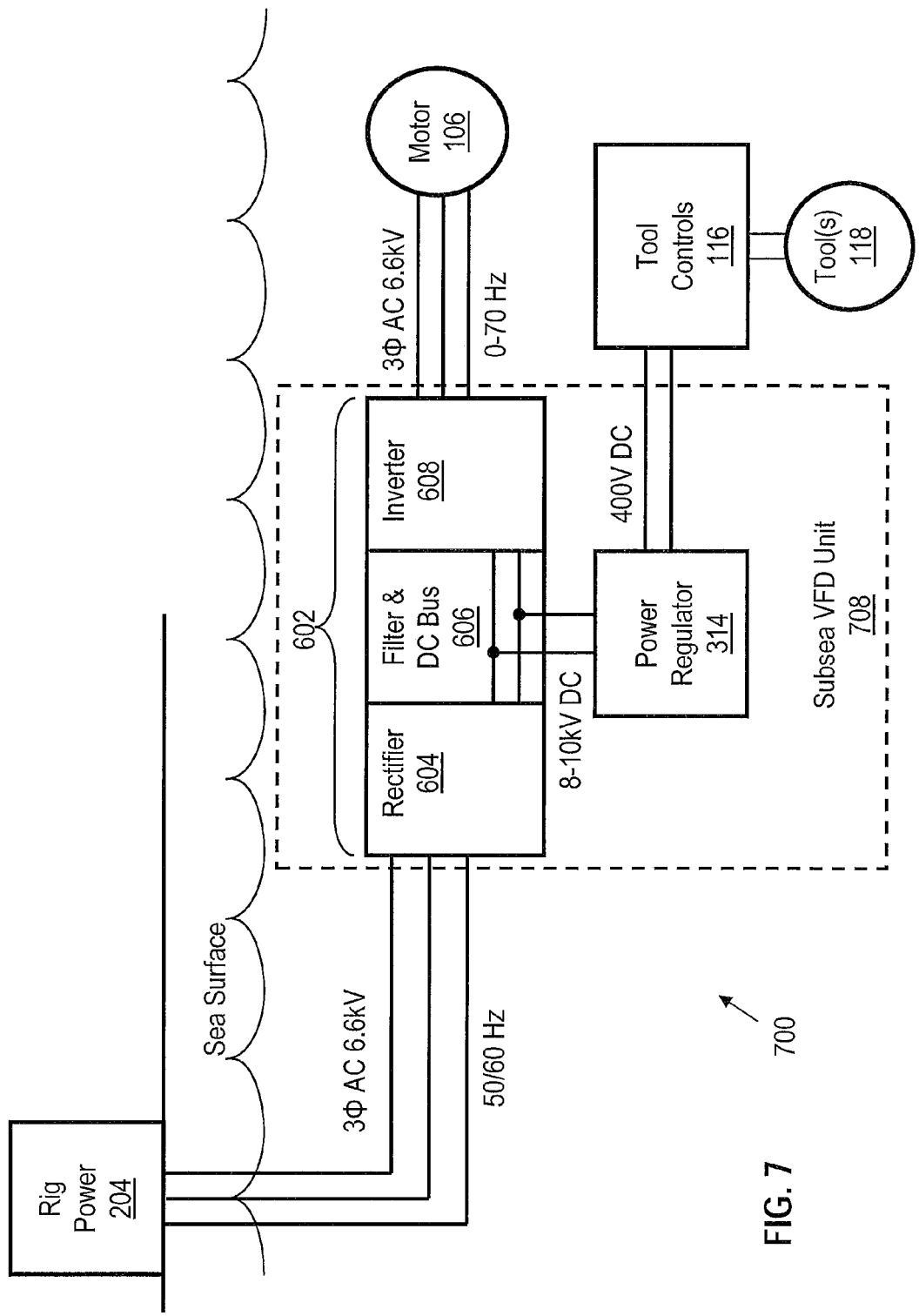
FIG. 7 illustrates another remote VFD power supply configuration for remote tools in accordance with an embodiment of the disclosure.

FIG. 7 illustrates another remote VFD power supply configuration 700 for remote tools in accordance with an embodiment of the disclosure. As shown in FIG. 7, the remote VFD power supply configuration 700 is the same as the remote VFD power supply configuration 600 except that a power regulator 714 is coupled to the filter and DC bus portion 606 of the remote VFD 602 such that some of the DC power output from the rectifier 604 is directed to the power regulator 714. The remote VFD 602 and the power regulator 714 may be part of a subsea VFD unit 708. The output of the power regulator 714 (e.g., about 400V DC) may power tool controls 116 and tool(s) 118. In some embodiments, the rig power unit 204 in the remote VFD power supply configuration 700 provides additional power to remote VFD 602 compared to the remote VFD power supply configuration 600 in order to compensate for the power siphoned off to the power regulator 714, tool controls 116 and tool(s) 118.

Figure 8:
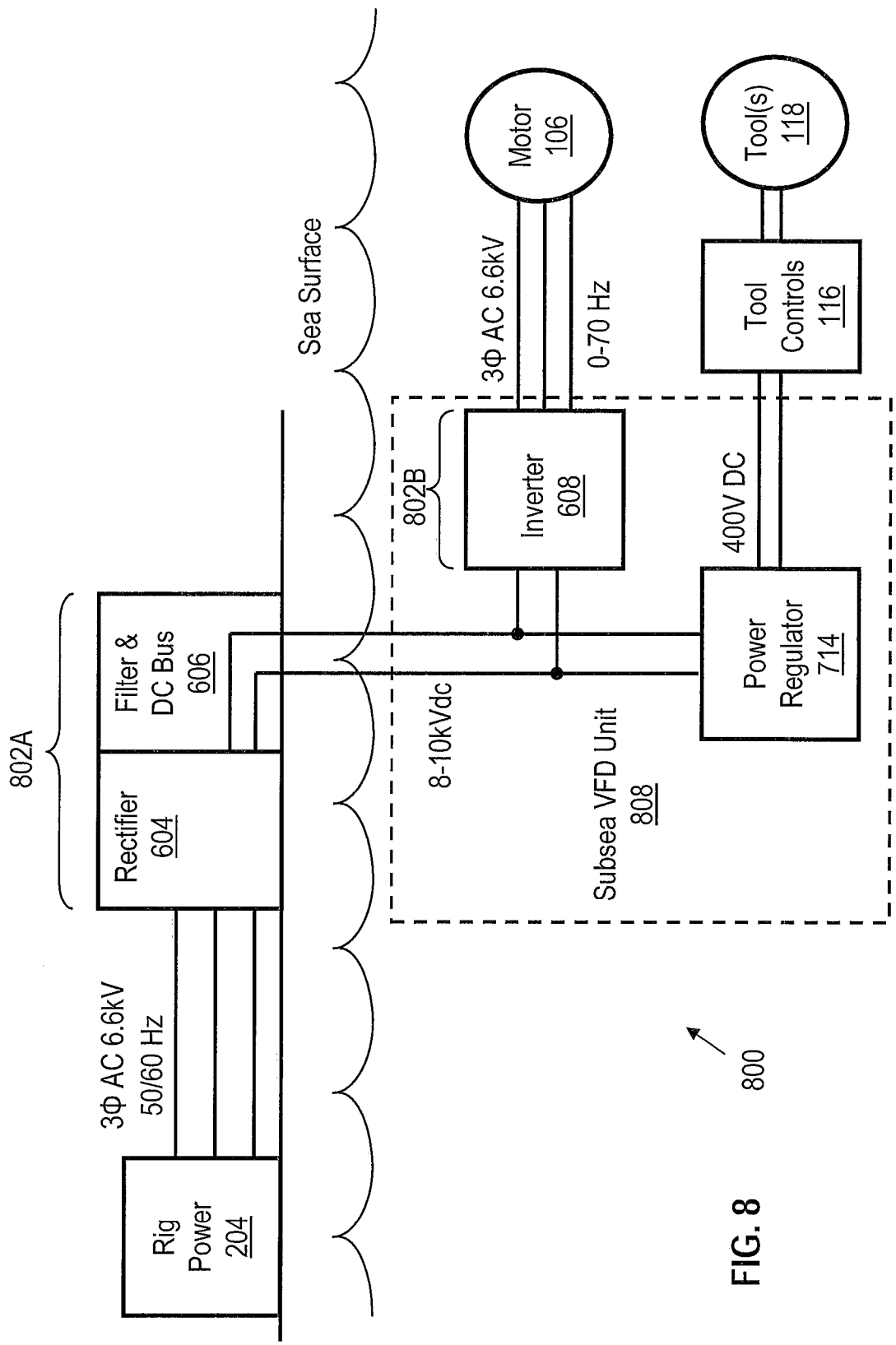
FIG. 8 illustrates another split VFD power supply configuration for remote tools in accordance with an embodiment of the disclosure.

FIG. 8 illustrates a split VFD power supply configuration 800 for remote tools in accordance with an embodiment of the disclosure. As shown in FIG. 8, the split VFD power supply configuration 800 comprises a split VFD with parts 802A and 802B. The VFD part 802A corresponds to a surface unit having the rectifier portion 604 and the filter and DC bus portion 606. The VFD part 802B comprises inverter 608. The VFD part 802B and power regulator 714 may be part of a subsea VFD unit 808 that powers motor 106, tool controls 116 and tool(s) 118.

As an example, the rig power unit 204 may provide 3-phase AC at about 6.6 kV and 50-60 Hz) to VFD part 802A, where the rectifier portion 604 rectifies the received AC signal and the filter and DC bus portion 606 smoothes rectifier output. The output of the filter and DC bus portion 606 is transmitted to remotely located VFD part 802B, where the inverter 608 provides variable AC power (e.g., 3-phase AC at about 6.6 kV and 0-70 Hz) to motor 106. In accordance with some embodiments, it may be understood that DC bus of the filter and DC bus portion 606 extends to the remotely located inverter 608. As shown, the power regulator 714 couples to the DC bus such that some of the DC power output from VFD part 802A is directed to the power regulator 714. The output of the power regulator 714 (e.g., about 400V DC) may power tool controls 116 and tool(s) 118. In some embodiments, the rig power unit 204 for the remote VFD power supply configuration 800 is configured to provide additional power compared to the remote VFD power supply configuration 600 to compensate for the power siphoned off to the power regulator 714, tool controls 116 and tool(s) 118.

Figure 9:
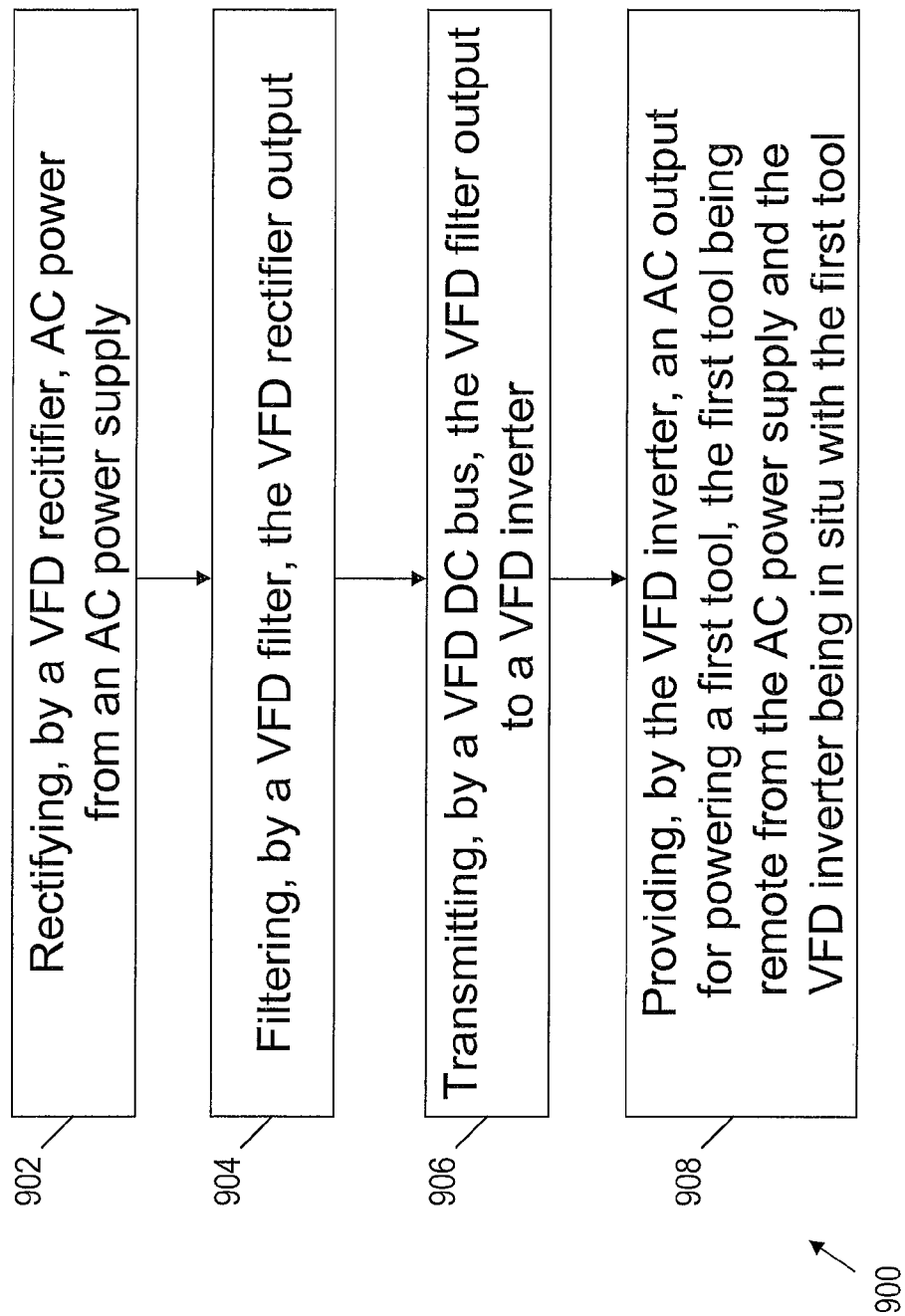
FIG. 9 illustrates a method in accordance with an embodiment of the disclosure.

FIG. 9 illustrates a method 900 in accordance with an embodiment of the disclosure. As shown, the method 900 comprises rectifying, by a VFD rectifier, AC power from an AC power supply (block 902). At block 904, the method 900 comprises filtering, by a VFD filter, the VFD rectifier output. The VFD filter output is then transmitted, by a VFD DC bus, to a VFD inverter (block 906). Finally, at block 908, an AC output is provided, by the VFD inverter, for powering a tool (e.g., motor 106), where the tool is remote from the AC power supply and the VFD inverter is in situ with the tool. For example, the AC power supply may be located on a sea surface rig or vessel, while the tool and the VFD inverter may be located on a subsea floor. In some embodiments, the VFD inverter is separated from the VFD rectifier and the VFD filter (e.g., the VFD rectifier and the VFD filter may be in situ with the AC power supply on the sea surface rig or vessel). In alternative embodiments, all the VFD components are in situ with the remote tool. In at least some embodiments, the method 900 additionally comprises re-directing some of the VFD filter output to a power regulator, wherein the power regulator output powers a second tool (e.g., tool controls 116 and/or tool(s) 118).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a first remote tool located subsea; and
    a variable frequency drive (VFD) coupled to the first remote tool, wherein the VFD output powers the first remote tool and wherein at least part of the VFD is in situ subsea with the first remote tool.

2. The system of claim 1 further comprising a tool power converter remote from the first remote tool, wherein the tool power converter converts AC power to DC power for transmission to a power regulator and tool controls in situ with a second remote tool.

3. The system of claim 1 further comprising a step-up transformer and a step-down transformer remote from the first remote tool, wherein the step-up transformer receives AC power, the step-down transformer receives the step-up transformer output, and the VFD receives the step-down transformer output.

4. The system of claim 1 wherein AC power from the VFD powers the first remote tool and wherein DC power drawn from the VFD powers a second remote tool.

5. The system of claim 4 wherein the DC power drawn from the VFD is provided to a power regulator and tool controls associated with the second remote tool.

6. The system of claim 2 wherein the VFD comprises a split VFD having a first part remote from the first remote tool and having a second part in situ with the first remote tool.

7. The system of claim 6 wherein the first part comprises a rectifier portion and a filter and DC bus portion and wherein the second part comprises an inverter portion.

8. The system of claim 1 wherein the VFD comprises a split VFD having a rectifier portion and a filter and DC bus portion remote from the first remote tool and having an inverter portion in situ with the first tool, and wherein the output of the filter and DC bus portion is provided to the inverter portion for powering the first remote tool and to a power regulator for powering a second remote tool.

9. The system of claim 1 further comprising an AC power supply that outputs 3-phase power at approximately 6-7 kV and 50-60 Hz to the VFD, and wherein the VFD outputs 3-phase power at approximately 6-7 kV and 0-70 Hz.

10. The system of claim 8 wherein the first remote tool comprises an AC-powered motor and wherein the second remote tool comprises a DC-powered subsea tree actuator.

11. A variable frequency drive (VFD) power supply, comprising:
    a VFD rectifier that receives AC power and rectifies the received AC power;
    a VFD filter that filters the VFD rectifier output; and
    a VFD inverter that receives the VFD filter output and provides variable AC power to a first subsea tool,
    wherein the VFD inverter is in situ with the first subsea tool.

12. The VFD power supply of claim 11 wherein the received AC power is 3-phase power at approximately 6-7 kV and 50-60 Hz and wherein the variable AC power is 3-phase power at approximately 6-7 kV and 0-70 Hz.

13. The VFD power supply of claim 11 wherein the VFD filter is in situ with the first tool and wherein DC power is drawn from the VFD filter output to power a second subsea tool.

14. The VFD power supply of claim 11 wherein the VFD rectifier and the VFD filter are remote from the VFD inverter.

15. The VFD power supply of claim 14 wherein some of the VFD filter output is re-directed to a power regulator that provides DC power to a second remote tool and tool controls for the second remote tool.

16. The VFD power supply of claim 15 wherein the first remote tool comprises an AC-powered motor and wherein the second remote tool comprises a DC-powered subsea tree actuator.

17. A power supply method, comprising:
    rectifying, by a variable frequency drive (VFD) rectifier, AC power;
    filtering, by a VFD filter, the VFD rectifier output;
    transmitting, by a VFD DC bus, the VFD filter output to a VFD inverter; and
    providing, by the VFD inverter, an AC output for powering a first tool located subsea,
    wherein the first tool is remotely located and wherein the VFD inverter is in situ subsea with the first tool.

18. The power supply method of claim 17 further comprising re-directing some of the VFD filter output to a power regulator, wherein the power regulator output powers a second tool.

19. The power supply method of claim 17 further comprising positioning the VFD rectifier and the VFD filter in situ with the first tool.

20. The power supply method of claim 17 further comprising positioning the VFD rectifier and the VFD filter in situ with a source of the AC power.

* * * * *